United States Patent [19]

Stankowski et al.

[11] Patent Number: 5,443,723
[45] Date of Patent: Aug. 22, 1995

[54] MEMBRANE SUPPORT AND SEALING APPARATUS

[75] Inventors: Ralph Stankowski, Westford; John Milcetich, Dover, both of Mass.

[73] Assignee: Millipore Corporation, Bedford, Mass.

[21] Appl. No.: 199,407

[22] Filed: Feb. 22, 1994

[51] Int. Cl.6 .............................................. B01D 63/00
[52] U.S. Cl. ......................... 210/321.75; 210/321.84; 210/321.6; 210/321.64; 210/232; 210/445; 210/446; 55/511; 264/DIG. 48
[58] Field of Search ............... 210/227, 230, 232, 489, 210/321.6, 321.64, 321.75, 321.84, 445, 446; 156/73.1; 55/511; 264/DIG. 48

[56] References Cited

U.S. PATENT DOCUMENTS

| | | | |
|---|---|---|---|
| 3,400,575 | 10/1968 | Madden | 210/321.84 |
| 3,577,331 | 5/1971 | Lacey et al. | 210/321.75 |
| 3,932,153 | 1/1976 | Byrns | 210/446 |
| 4,039,455 | 8/1977 | Bardin et al. | 210/321.84 |
| 4,056,100 | 11/1977 | Noiles | 210/446 |
| 4,829,005 | 5/1989 | Friedman et al. | 210/416.1 |
| 4,837,161 | 6/1989 | Stevens et al. | 210/321.84 |
| 4,874,513 | 10/1989 | Chakraborty et al. | 210/321.84 |
| 5,011,555 | 4/1991 | Sager | 210/446 |
| 5,141,639 | 8/1992 | Kraus et al. | 210/321.75 |
| 5,252,222 | 10/1993 | Matkovich et al. | 210/321.64 |
| 5,265,770 | 11/1993 | Matkovich et al. | 210/321.84 |
| 5,269,917 | 12/1993 | Stankowski | 210/232 |

Primary Examiner—Robert A. Dawson
Assistant Examiner—Ana M. Fortuna
Attorney, Agent, or Firm—Andrew T. Karnakis; Paul J. Cook

[57] ABSTRACT

A membrane support apparatus is provided which includes a top section, a mating base section and a membrane support surface within the mated sections. The apparatus includes a first peripheral seal formed by extension on one of the sections which mates with a groove on the other of the sections, a second seal formed by a smooth surface on either the groove or the extension which mates with a bead on the other of the groove or extension to form a second peripheral seal. The top section and the base section optionally can form a third peripheral seal about the periphery of a membrane on the membrane support surface.

13 Claims, 8 Drawing Sheets

MEMBRANE SUPPORT AND SEALING APPARATUS

BACKGROUND OF THE INVENTION

This invention relates to a membrane support apparatus which includes a porous membrane and a support structure for the porous membrane. More particularly, this invention relates to a membrane support apparatus wherein one or more membranes are sealed in position between a base section and a top section by a plurality of peripheral seals.

Prior to the present invention, membrane support apparatus, including filtration apparatus have been provided which comprise a porous membrane such as a microporous membrane positioned between and sealed at its periphery between a base section and a top section. Inlet means are provided for introducing a liquid sample in the space between the top section and the base section and an outlet means is provided in the base section so that a liquid passes through the membrane from which is deposited on the membrane a filtrate or a solute component of the liquid. The remaining liquid is removed from the apparatus through the outlet. The membrane is sealed between the top section and the base section in a manner to prevent liquid from by-passing the membrane. That is, sealing is effected so that all of the liquid introduced is passed through the membrane prior to passing through the outlet. The membrane can be sealed to the internal peripheral surface of the base section or the membrane can be sealed to both the top section and the base section and between the two sections. The membrane can be heat sealed or solvent bonded to the base section as disclosed in U.S. Pat. No. 4,501,663 or the membrane can be ultrasonically welded between the base section and the top section as disclosed, for example in U.S. Pat. No. 4,640,777. With prior art devices, the weld or seal is effective only up to moderate pressure, for example between about 50 and 75 psi for polyethylene devices and between 75 and 100 psi for devices made from a polycarbonate-polyester melt alloy for a typical 25 mm diameter device. In addition, these sealing methods require expensive operating equipment that provide inconsistent and unpredictable hermetic seal failure. In addition, such sealing methods are not useful when it is desired to recover the membrane within the apparatus after use such as in the application of DNA synthesis on the membrane.

Accordingly, it would be desirable to provide a membrane support apparatus which can provide a consistently reliable seal about the membrane. In addition, it would be desirable to provide such an apparatus in a form which can be easily opened and closed so that a membrane can be easily positioned within the apparatus and can be easily removed from the apparatus. Furthermore, it would be desirable to provide such an apparatus which is capable of withstanding high internal pressure during use.

SUMMARY OF THE INVENTION

In accordance with this invention, a membrane support apparatus is provided which is formed from a top section and a base section with one or more membranes interposed between the two sections. The top section and base section are joined together by a friction fit which also can be an interlocking arrangement. Two peripheral seals are formed when the top section and base section are joined together. One peripheral seal is formed by one or a plurality of peripheral sealing beads located on either the top section or the base section and contact and seal against a relatively flat surface on the adjacent top section or base section. The second peripheral seal is formed by an extension such as a tongue on one of the base section or top section which mates with a groove in the other of the base section or top section. The extension and groove can be interlocking or can be fit together by frictional forces. One or more membranes are positioned between the top section and the base section and are sealed about their periphery by the top section and the base section. An inlet and an outlet are provided to permit fluid flow through the membranes. A third peripheral seal optionally can be provided to pressure-seal the periphery of the membrane between the top section and the bottom sections. The membrane apparatus is capable of withstanding internal pressure up to about 500 psi or higher. In one embodiment, the top section and base section can be separated from each other by hand to permit removal of the membrane without damaging the membrane.

DESCRIPTION OF SPECIFIC EMBODIMENTS

The membrane support apparatus of this invention is formed by a top section and a base section which are frictionally joined together such as by being interlocked and with one or more membranes interposed therebetween. One or a plurality of sealing ridges such as a sealing bead are positioned about the periphery of a surface of the top section or the base section which are in sealing relationship with a smooth surface on the other of the base section or top section. The bead seal is positioned adjacent the membrane which, in turn, is positioned between the top section and the base section. A second peripheral seal is formed by a tongue on the base section or top section which mates with a groove on the other of the top section or base section. The tongue and groove are sized so as to bias the bead seal into sealing relationships with the mating smooth surface. The tongue and groove is frictionally sealed together with or without interlocking means. The membrane optionally is sealed about its periphery to form a third seal by being bonded to the base section or by a pressure seal exerted by the top section in close proximity with the base section about the membrane periphery. When forming DNA or the like on a membrane, for example, it is not necessary to include a third seal since a small amount of by pass of a reagent forming a moiety of the DNA is not important. However, when the apparatus is utilized in filtration, the third peripheral seal is necessary. In any event the first and second seals utilized in the present invention provide substantially stronger sealing between the top section and the base section as compared to presently available sealing arrangements. The top section and base section can be joined together or separated from each other by hand, if desired.

Figure 1:
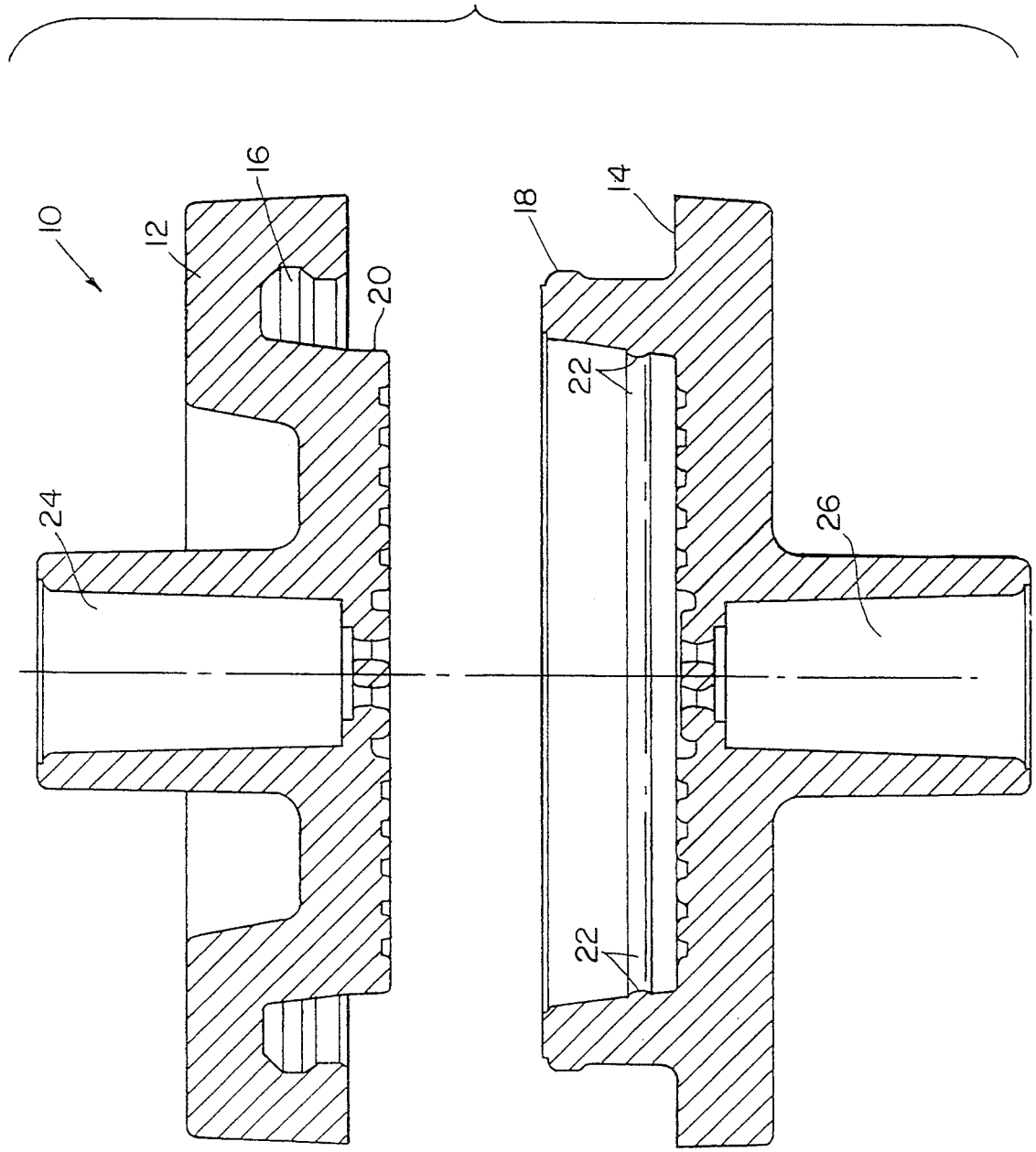
FIG. 1 is a cross-sectional exploded view of the apparatus of this invention.

Referring to FIG. 1, the membrane support apparatus 10 of this invention includes a top section 12 and a bottom section 14. As shown in FIG. 1 the top section 12 includes a groove 16 into which is fit the tongue 18 on base section 14. It is to be understood that the position of the tongue and groove can be reversed from that shown in FIG. 1. That is, the groove can be positioned on the base section 14 while the tongue is positioned on the top section 12. The tongue 18 and groove 16 form one peripheral seal when positioned together. In addition, the tongue 18 and groove 16 are sized to force smooth peripheral surface 20 against bead seal 22 thereby to form a second peripheral seal. It is to be understood that more than one bead 22 can be provided on surface 21 to further improve sealing. The top section 12 is provided with a fluid inlet 24 while the bottom section 14 is provided with a fluid outlet 26.

Figure 2:
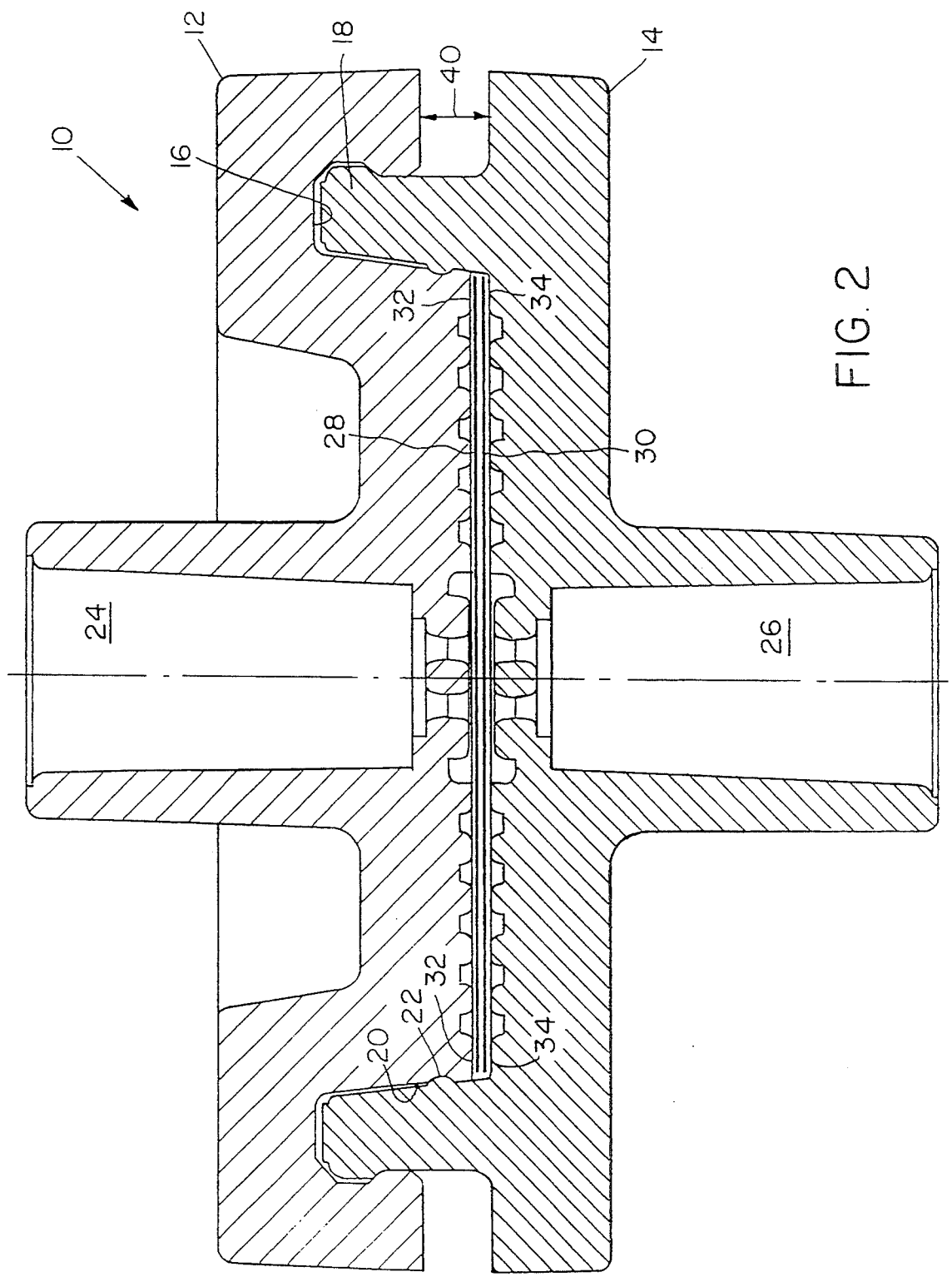
FIG. 2 is a cross-sectional view of the apparatus of FIG. 1 with the top and base sections joined.

As shown in FIG. 2, when the top section 12 and base section 14 are snap fit together. Tongue 18 fits into groove 16 to form an interlocking seal which extends about the periphery of the apparatus 10. The tongue 18 is sized so as to force surface 20 against sealing bead 22 to thereby form a second peripheral seal. A third seal can be provided about the periphery of the two membranes 28 and 30 by the inner surface 32 of top section 12 and inner surface 34 of base section 14 which are forced together by virtue of first peripheral seal formed from tongue 18 and groove 16. Alternatively, a single membrane can be sealed about its periphery to the base section such as by heat, solvent or ultrasonic sealing. More than two membranes can be positioned between top section 12 and base section 14 if desired. The top section 12 may be positioned away from base section 14 by space 40 to permit apparatus 10 to be opened either by hand or with an instrument after use.

Figure 3:
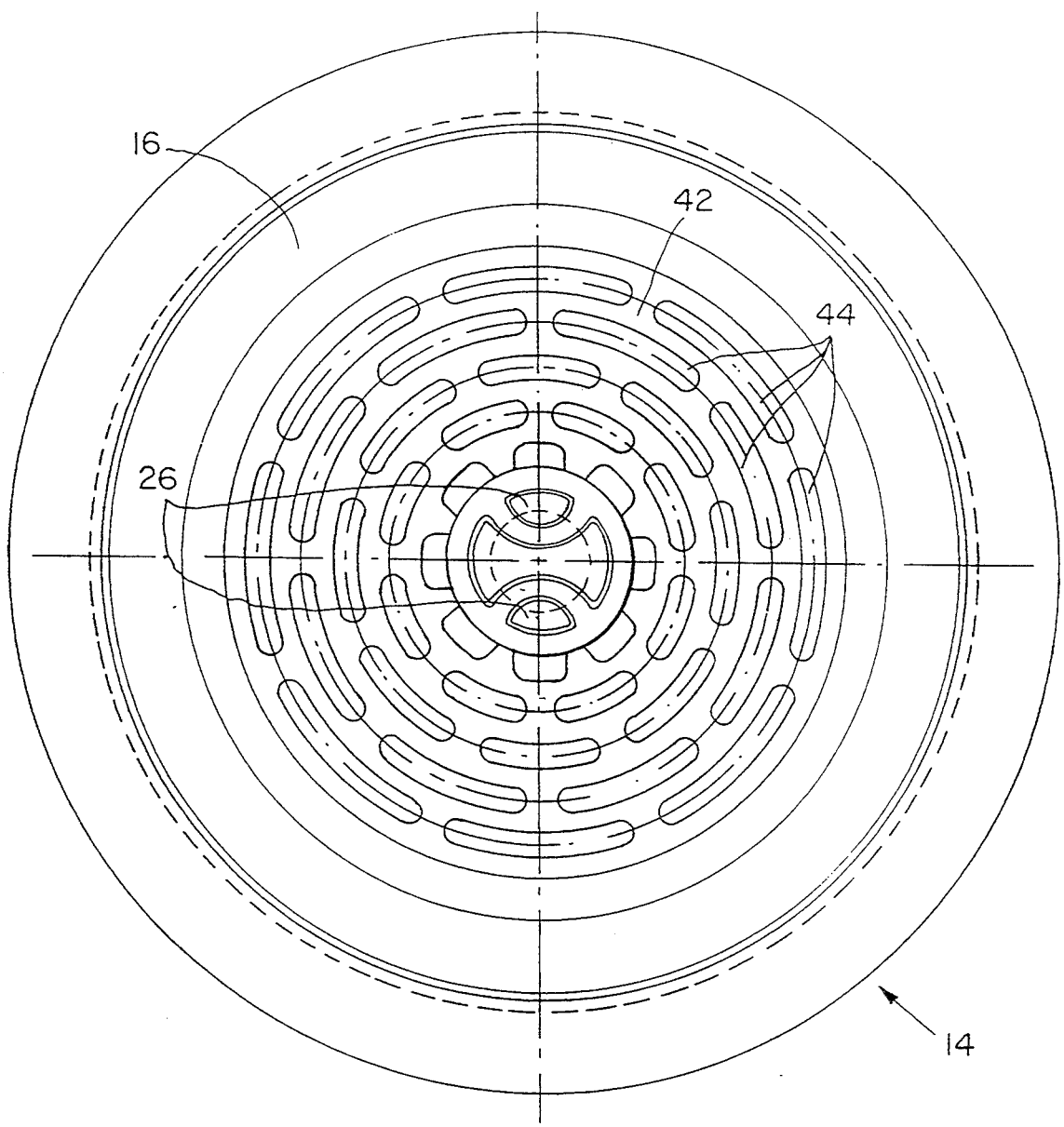
FIG. 3 is a top view of an outlet flow means useful in the present invention.

As shown in FIG. 3, the inner surface 42 of base section 14 has a staggered fluid path formed by projections 44 to provide uniform fluid flow to outlet 26. Other suitable means to support membranes will be obvious to those skilled in the art.

Figure 4:
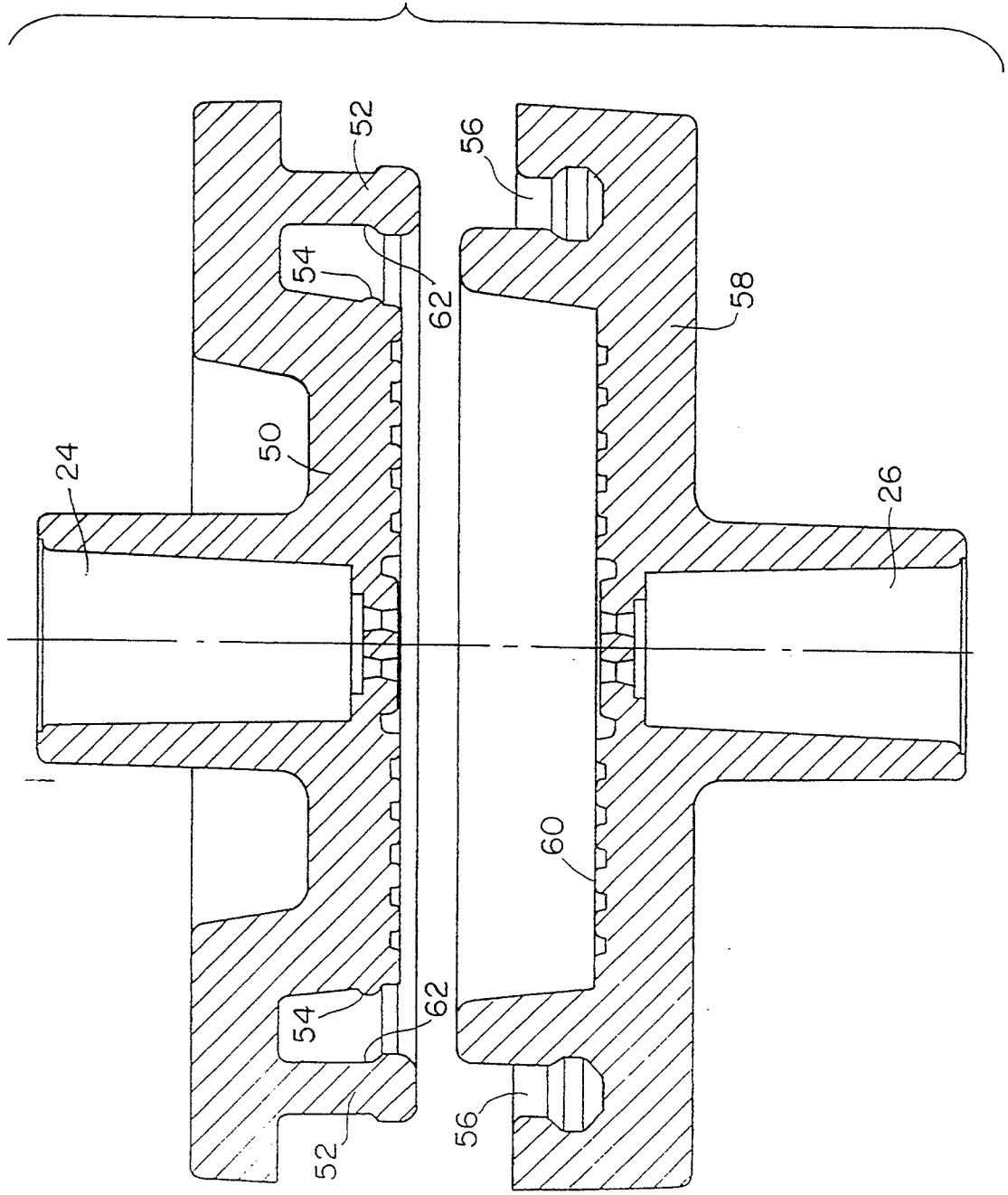
FIG. 4 is a cross-sectional exploded view of an alternative apparatus of this invention.
Figure 5:
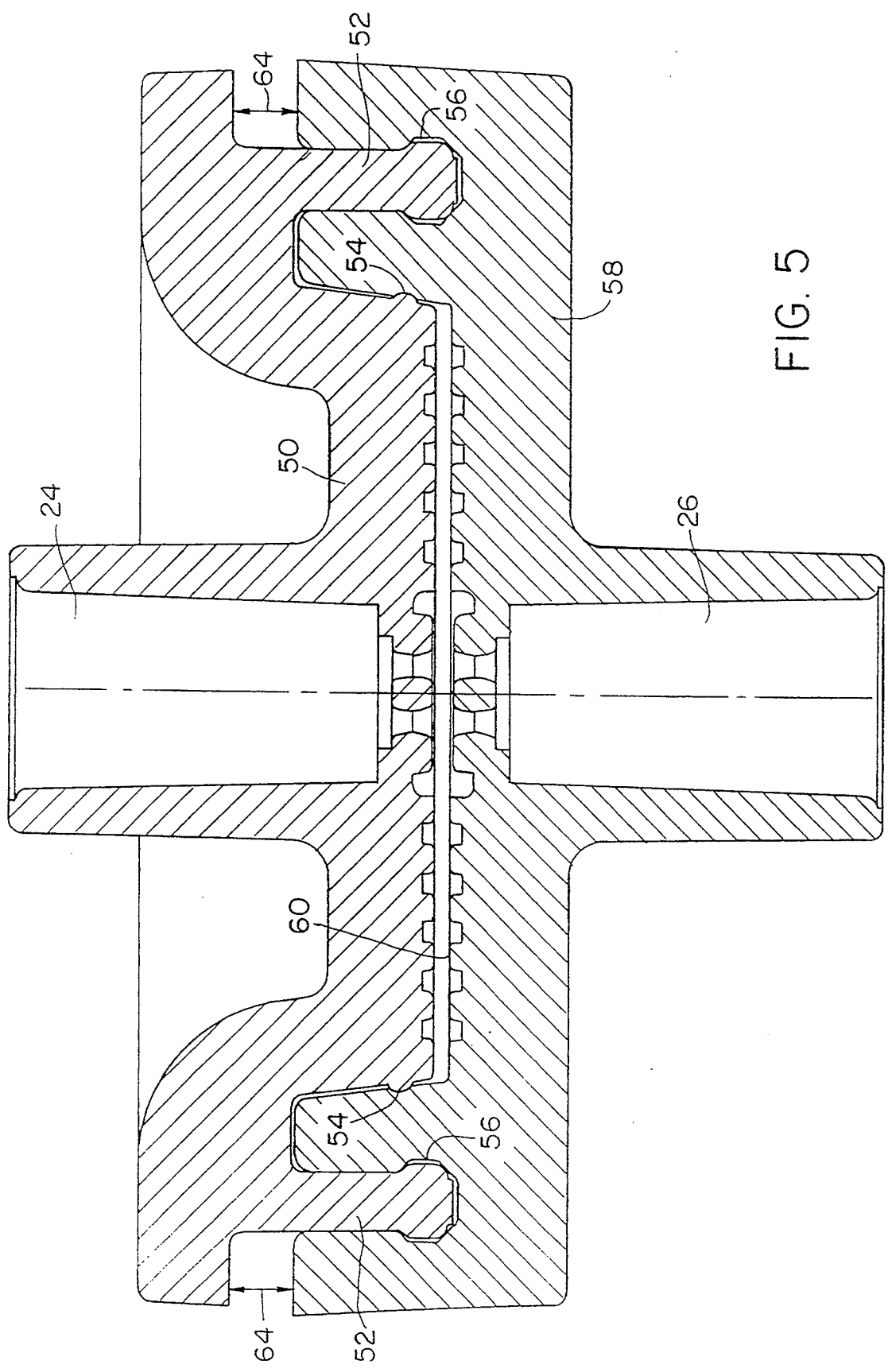
FIG. 5 is a cross-sectional view of the apparatus of FIG. 4 with the top and bottom sections joined.

Referring to FIGS. 4 and 5, the top section 50 having inlet 24 includes a tongue 52 and a peripheral bead 54. Tongue 52 fits into peripheral groove 56 on base section 58 to form an interlocking seal. Base section 58 includes membrane support surface 60. When top section 50 is joined to bottom section 58, bead 54 is sealed against surface 62. Space 64 permits separating the top section 50 from bottom section 58 by hand.

Figure 6:
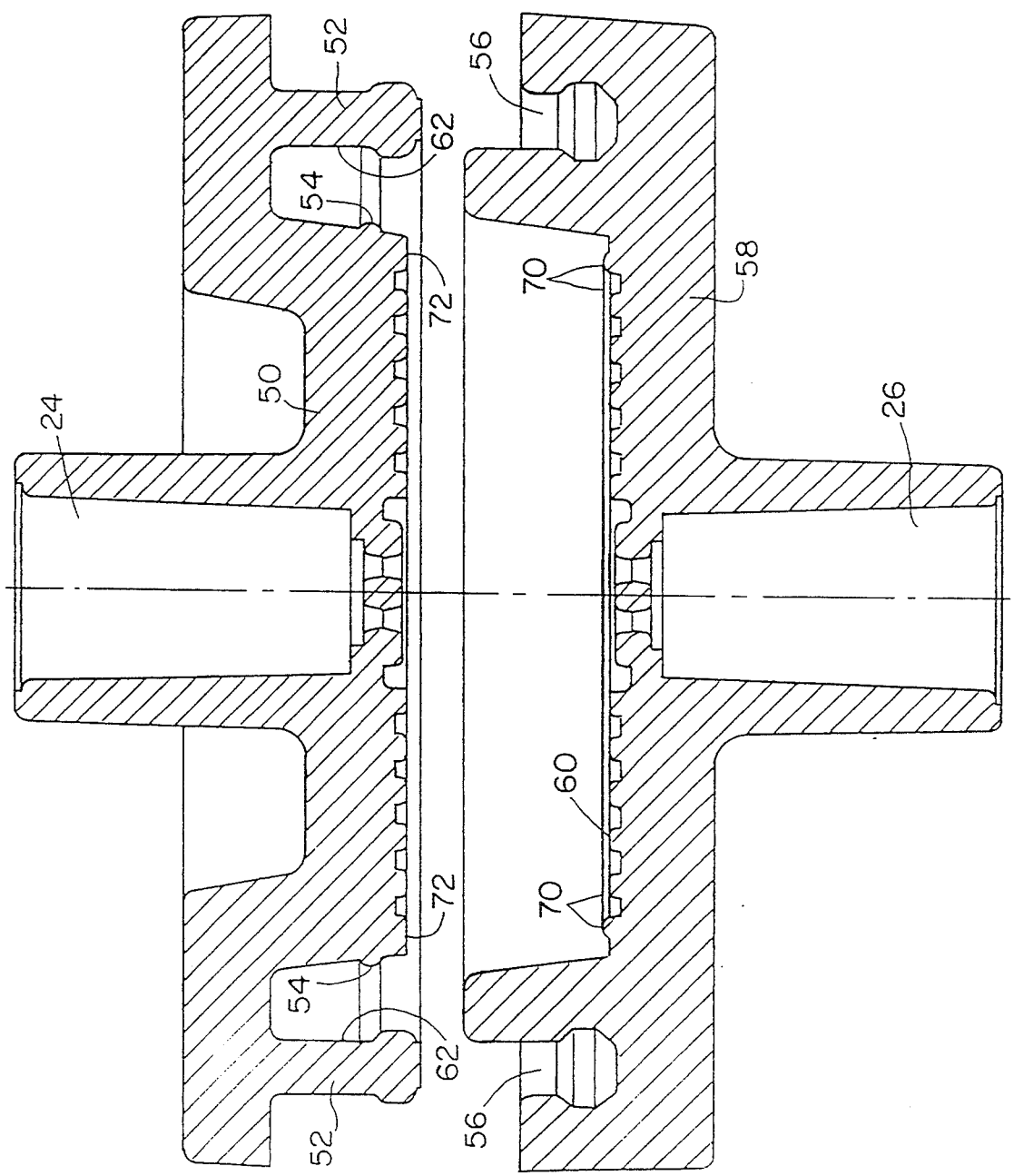
FIG. 6 is a cross-sectional exploded view of the apparatus of this invention having three peripheral seals.

Referring to FIG. 6, the elements having the same numerical indicia as those shown in FIG. 4 are the same elements described in FIG. 4. A second peripheral bead 70 is included on base section 58. The bead 70 cooperates with smooth surface 72 of top section 50 to provide a pressure seal comprising a third seal about the periphery of a membrane positioned on support surface 60. The interlocking seal provided by tongue 52 and groove 56 biases the bead 70 toward surface 72.

Figure 7:
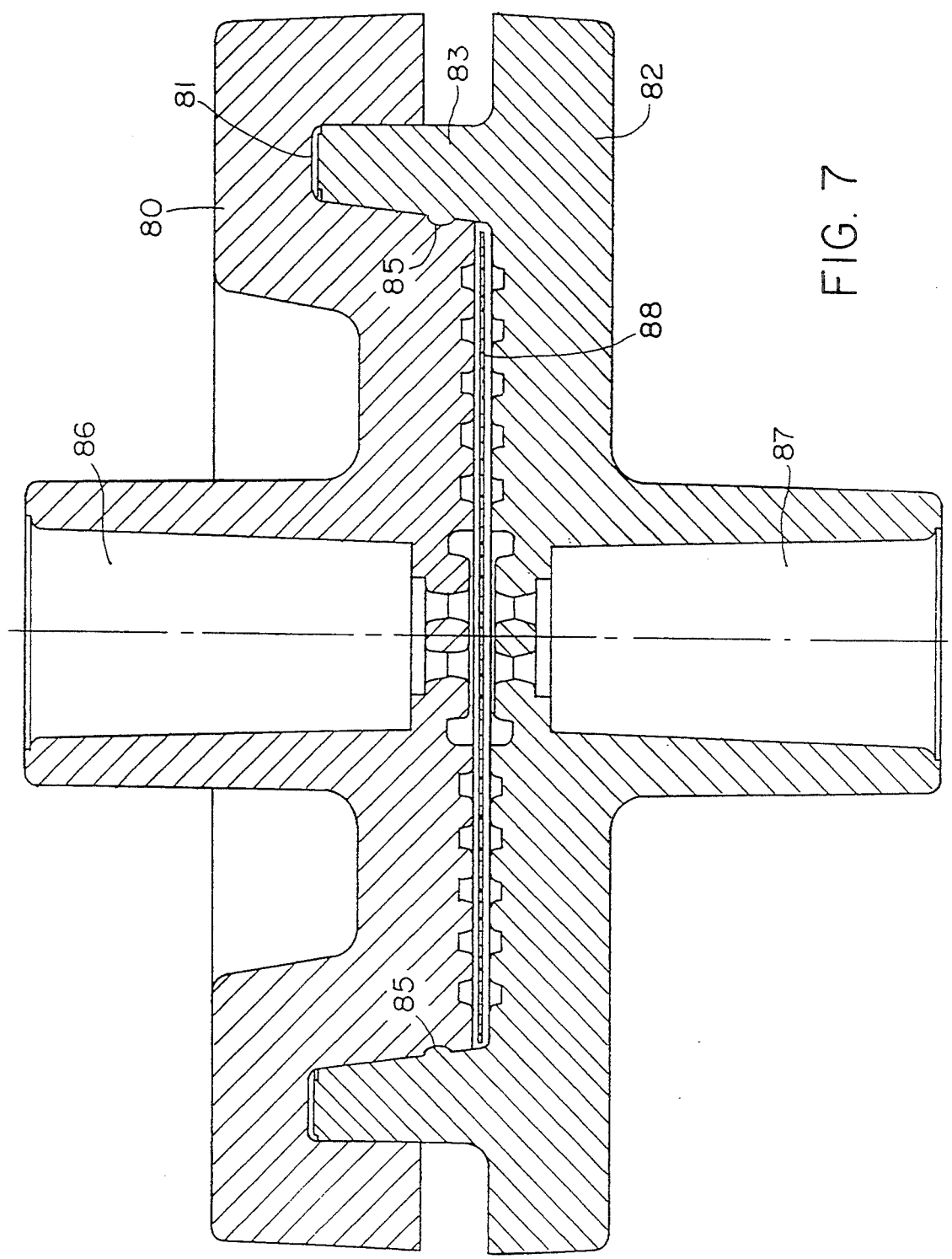
FIG. 7 is a cross-sectional view of an alternative embodiment of this invention.

Referring to FIG. 7 an embodiment of this invention is shown wherein the top section 80 having groove 81 is press fit by frictional forces with tongue 83 of base section 82. A second seal is provided by peripheral bead 85 in the manner described above with reference to FIGS. 1 and 2. The top section 80 is provided with inlet 86. Base section 82 is provided with outlet 87. One or more membranes are positioned within space 88 in the manner described above.

Figure 8:
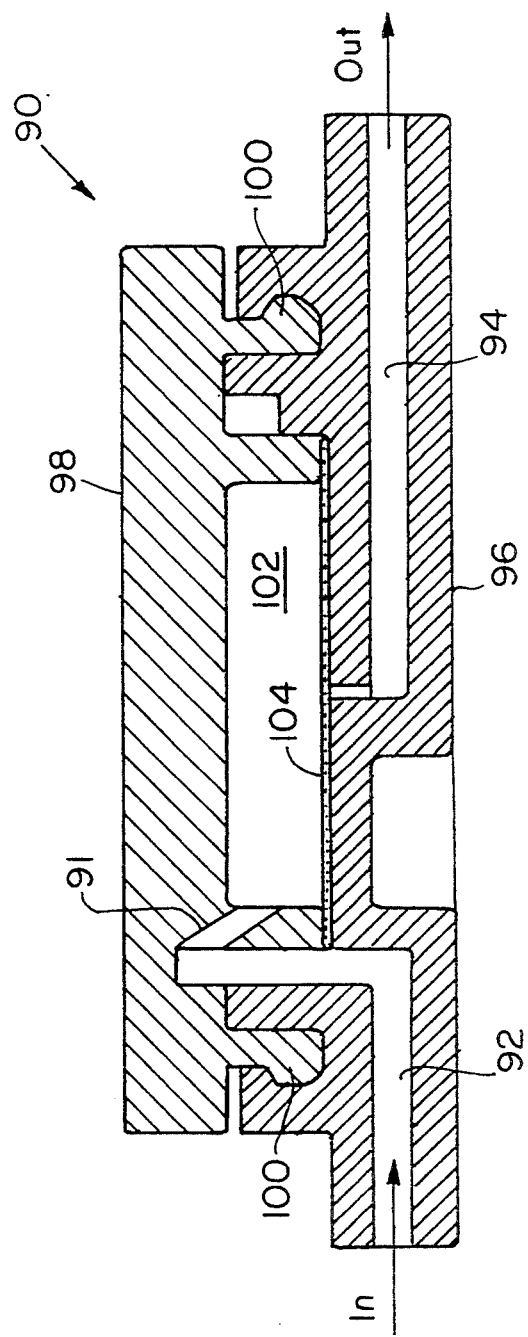
FIG. 8 is a cross-sectional view of an alternative embodiment of this invention having an inlet and an outlet on the base section.

Referring to FIG. 8, an embodiment of the invention 90 is shown which has the fluid inlet 92 and fluid outlet 94 on the base section 96. The top section 98 is provided with peripheral tongue 100 which interlocks with a groove in base section 96 in the manner described above. Fluid enters space 102 between top section 98 and base section 96 through inlet port 91. Fluid is passed through membrane 104 and through outlet 94.

In use, a fluid to be processed through membranes 28 and 30 is introduced through inlet 24 and removed through outlet 26. Fluid bypass is prevented by the seal formed between tongue 18 and groove 16, the seal between bead 22 and surface 20 and the seal between surface 32 and surface 34. Upon completion of fluid processing, a force is applied between top section 12 and base section 14 within space 40 in order to separate the top section 12 from the base section 14 and to permit recovery of the membranes 28 and 30 which can have thereon, a filtrate, or a formed product such as DNA, a protein or the like. As set forth above, space 40 can be eliminated when it is not desired to separate the top section 12 from the base section 14.

We claim:

1. A membrane support apparatus formed from a top section and a base section, said apparatus having a fluid inlet and a fluid outlet
   one of said top section or said base section having a peripheral extension or a peripheral groove, said peripheral extension frictionally fits within said peripheral groove of said top section or base section lacking said peripheral extension to form a first peripheral seal,
   said top section or said base section including said extension having a first peripheral surface
   said base section having a membrane support surface,
   said top section or said base section having said peripheral grove having a second peripheral surface within said peripheral groove,
   a peripheral sealing ridge on one of said first peripheral surface or said second peripheral surface to mate with a smooth surface on said first peripheral surface or second peripheral surface lacking said ridge, said smooth surface and said ridge being in frictional contact to form a second peripheral seal,
   at least one membrane positioned on said membrane support.

2. The apparatus of claim 1 which includes a third peripheral seal about the periphery of said at least one membrane.

3. The apparatus of claim 1 wherein said extension and said groove form an interlocking seal.

4. The apparatus of claim 1 wherein said extension and said groove form a friction noninterlocking seal.

5. The apparatus of claim 2 wherein said extension and said groove form an interlocking seal.

6. The apparatus of claim 2 therein said extension and said groove form a friction noninterlocking seal.

7. The apparatus of any one of claims 1, 2, 3 or 4 wherein said peripheral extension is positioned on said top section.

8. The apparatus of any one of claims 1, 2, 3, or 4 wherein said peripheral extension is positioned on said base section.

9. The apparatus of any one of claims 1, 2, 3, 4, 5 or 6 wherein one membrane is positioned on said membrane support surface.

10. The apparatus of any one of claims 1, 2, 3, 4, 5, or 6 wherein a plurality of membranes are positioned on said membrane support surface.

11. The apparatus of any one of claims 1, 2, 3, 4, 5 or 6 wherein said sealing ridge is positioned on said first peripheral surface.

12. The apparatus of any one of claims 1, 2, 3, 4, 5 or 6 wherein said sealing ridge is positioned on said second peripheral surface.

13. The apparatus of any one of claims 1, 2, 3, 4, 5 or 6 including a plurality of said peripheral sealing ridge.

* * * * *